United States Patent

[11] 3,584,273

| [72] | Inventors | Ernst Massar<br>Erlangen;<br>Erich Rainer, Nurnberg, both of Germany |
|---|---|---|
| [21] | Appl. No. | 706,263 |
| [22] | Filed | Feb. 19, 1968 |
| [45] | Patented | June 8, 1971 |
| [73] | Assignee | Simens Aktiengesellschaft<br>Berlin; Munich, Germany |
| [32] | Priority | Mar. 7, 1967 |
| [33] | | Germany |
| [31] | | 108,680 |

[54] LOW LOSS DC MOTOR
8 Claims, 7 Drawing Figs.

[52] U.S. Cl. .................................................. 318/138,
310/68, 310/179
[51] Int. Cl. ........................................................ H02k 29/00
[50] Field of Search............................................ 310/156,
177, 43, 45, 179, 46, 68, 166, 261, 181, 254, 258,
259, 138; 318/254

[56] References Cited
UNITED STATES PATENTS

| 3,271,649 | 9/1966 | Juegensen ..................... | 318/138 |
|---|---|---|---|
| 3,304,481 | 2/1967 | Saussele ....................... | 318/138 |
| 2,785,366 | 3/1957 | Goodwin ....................... | 310/46 |
| 3,178,625 | 4/1965 | Pintell .......................... | 310/46 |
| 3,210,631 | 10/1965 | Niccolls....................... | 310/46 |
| 3,250,971 | 5/1966 | Brunner ....................... | 318/254 |
| 3,299,335 | 1/1967 | Wessels ....................... | 310/156 |
| 3,344,325 | 9/1967 | Sklaroff........................ | 310/156 |
| 3,344,295 | 7/1968 | Cory............................. | 310/46 |

*Primary Examiner*—D. X. Sliney
*Assistant Examiner*—R. Skudy
*Attorneys*—Curt M. Avery, Arthur E. Wilfond, Herbert L. Lerner and Daniel J. Tick

ABSTRACT: The stator of a DC motor having permanent magnet excitation has two winding groups displaced by 90 electrical degrees within each of the pole divisions. The winding groups are periodically connected in series by electronic circuit components. The magnetization of the permanent magnet poles of the rotor corresponds to an induction distribution along the pole arc of which the sum of the induced individual voltages is substantially constant.

PATENTED JUN 8 1971  3,584,273
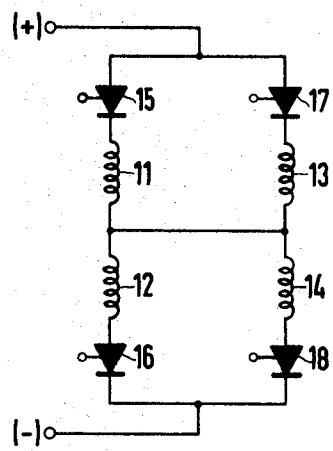
Fig. 1a
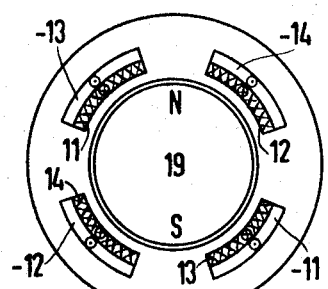
Fig. 1b
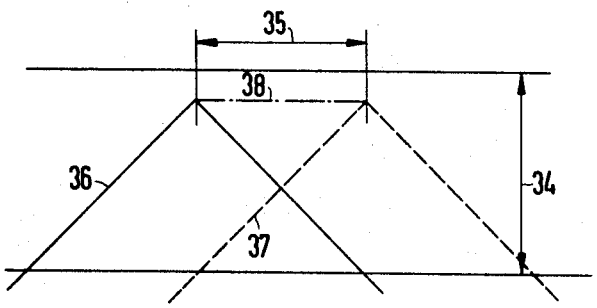
Fig. 3b
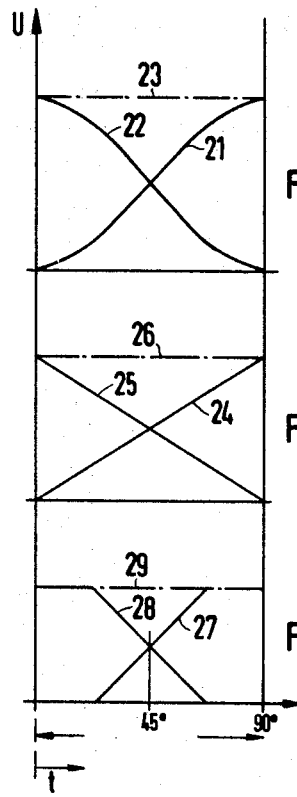
Fig. 2a
Fig. 2b
Fig. 2c
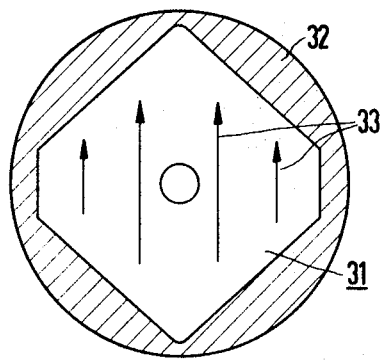
Fig. 3a

LOW LOSS DC MOTOR

DESCRIPTION OF THE INVENTION

Our invention relates to a DC motor. More particularly, our invention relates to a miniature DC motor having low loss due to induced voltages.

The current flow through a DC motor which is energized by a substantially constant DC source is determined by the difference between the applied voltage and the opposing voltage which is induced in the winding. When both the applied voltage and the opposing voltage are constant during the commutation period, a constant current flows and causes corresponding copper losses in addition to the rapid decay of the commutation process due to high effective resistances.

If the difference between the applied voltage and the opposing voltage varies due to variations in time in the resultant voltage, at the same average current and appropriately constant torque, current variations are produced in correspondence with said difference and cause additional copper losses as well as a considerable decrease in efficiency. The increase in losses is especially vital with regard to battery-driven motors, since it causes a considerable decrease in the period of operation of the motor.

In a DC motor having a conventional commutator and carbon brushes, the variations of the total or resultant voltage in the series-connected windings are relatively small, since only relatively small parts of the windings are commutated in accordance with the number of commutator segments. The cost of electronic circuit components limits their number so that relatively large parts of the windings are necessarily commutated and the induced opposing voltage varies correspondingly considerably.

The principal object of the present invention is to provide a new and improved DC motor.

An object of the present invention is to provide a new and improved miniature DC motor.

An object of the present invention is to provide a DC motor having low losses.

Another object of the present invention is to provide a DC motor having reduced induced opposing voltage variations and therefore reduced additional losses caused thereby.

In accordance with our invention, a DC motor with permanent magnet excitation and electronically commutated winding groups comprises a permanent magnet rotor having magnet poles, each having a pole arc. A stator has two winding groups displaced by 90 electrical degrees within each of the pole divisions and periodically connected in series by electronic circuit components. The magnetization of the permanent magnet poles corresponds to an induction distribution along the pole arc at which distribution the sum of the induced individual voltages is substantially constant.

The magnetization of the permanent magnetic poles is such that at 45 electrical degrees from the center of each pole, the induction value equals half the amplitude value of the sum of the induced voltages and the distribution of the induction values is symmetrical on both sides of the half amplitude value. The induction distribution along the pole arc is provided by the dimensions of the geometric configuration of the permanent magnet. The windings of each winding group are positioned so that they extend over less than half the pole arc. The windings of each winding group may extend over the entire corresponding half of the pole arc and the distribution of the winding along the pole arc is irregular. The windings of the groups are positioned in slots formed in the stator.

The rotor may comprise ferrite structure which forms a permanent magnet. The rotor may have a configuration different from a cylinder and the space between the rotor and a cylindrical configuration is filled with nonmagnetic material. That is, synthetic nonmagnetic material is sprayed onto the noncylindrical configuration to form a cylinder.

In order that our invention may be readily carried into effect, it will now be described with reference to the accompanying drawing, wherein:

FIG. 1a is a circuit diagram of an embodiment of the DC motor of our invention;

FIG. 1b is a schematic diagram of an embodiment of the DC motor of our invention having two poles;

FIGS. 2a, 2b and 2c are graphical presentations illustrating the pole arc distribution of the induced opposing voltages in the windings of the motor of FIGS. 1a and 1b;

FIG. 3a is an axial section of an embodiment of a rotor of the motor of our invention having a noncylindrical configuration; and FIG. 3b is a graphical presentation of the pole arc distribution of the induced opposing voltages in the winding of a motor including the rotor of FIG. 3a.

In the figures the same components are identified by the same reference numerals.

In FIG. 1a, a DC voltage applied by the battery which drives the motor is applied to the input voltage terminals (+) and (−). The stator windings 11, 12, 13 and 14 are connected in series with electronic circuit components 15, 16, 17 and 18 between the input voltage terminals. Each of the electronic circuit components functions as a switching unit and may comprise a semiconductor controlled rectifier, a transistor, or any suitable electronic switch.

The commutation of the motor, or the switching of the electronic circuit components 15, 16, 17 and 18 thereof may be provided by any suitable circuit arrangement such as, for example, that shown in FIGS. 1 and 2 of copending Pat. application Ser. No. 634,212, filed Apr. 27, 1967 and assigned to the assignee of the present invention, FIG. 4 of copending Pat. application Ser. No. 655,870, filed July 25, 2967 and assigned to the assignee of the present invention, FIG. 2 of copending Pat. application Ser. No. 661,897, filed Aug. 21, 1967 and assigned to the assignee of the present invention, FIG. 1 of copending Pat. application Ser. No. 664,139, filed Aug. 29, 1967 and assigned to the assignee of the present invention, FIG. 1 of copending Pat. application Ser. No. 668,013, filed Sept. 15, 1967 and assigned to the assignee of the present invention, and FIG. 1 of copending Pat. application Ser. No. 687,760, filed Dec. 4, 1967 and assigned to the assignee of the present invention.

In FIG. 1b, a rotor 19 has a north pole N and a south pole S, which form the poles of the permanent magnet. The windings 11, 12, 13, 14 and −11, −12, −13 and −14 are positioned in slots formed in the stator of the motor.

The windings 11, 12, 13 and 14 conduct current in a positive direction and are positioned within two pole divisions. During operation, two windings are always conducting at the same time, and commutation is provided in cycles by the electronics circuit components 15, 16, 17 and 18 (FIG. 1a). This results in a strongly varying rotary field which is followed by the permanent magnet rotor 19. The permanent magnet rotor 19 thus induces opposing voltages in each winding relative to the direct voltage applied to the winding by the battery. This limits the flow of current to a magnitude which corresponds to the load.

FIGS. 2a, 2b and 2c illustrate the foregoing process. In each of FIGS. 2a, 2b and 2c, the abscissa represents the pole arc in electrical degrees and represents the time at a constant angular velocity of the rotor. The ordinate represents the induced voltage U. In FIGS. 2a, 2b and 2c, curves 21, 22, 24, 25, 27 and 28 represent the distribution of the induced voltages or the induction distribution.

The curves 21 and 22 of FIG. 2a disclose an induced voltage distribution of sinusoidal configuration extending over a period of 90 electrical degrees. The curves 24 and 25 of FIG. 2b disclose an induced voltage distribution of triangular configuration extending over a period of 90 electrical degrees. The curves 27 and 28 of FIG. 2c illustrate an induced voltage distribution of trapezoidal configuration extending over a period of 90 electrical degrees. In FIG. 2a, the curve 23 is the resultant or sum of the individual induced voltages. In FIG. 2b, the curve 26 is the resultant or sum of the individual induced voltages 24 and 25. In FIG. 2c, the curve 29 is the resultant or sum of the individual induced voltages 27 and 28.

It may be assumed that the induced voltage represented by the curve 21 of FIG. 2a is $e_1$ and the induced voltage represented by the curve 22 is $e_2$. The induced voltage $e_1$ is induced in the winding 11 by a magnetic pole of the rotor 19 (FIG. 1b) as said pole passes said winding. The induced voltage $e_2$ is induced in the winding 12 immediately thereafter at a displacement of 90 electrical degrees.

Since both induced voltages $e_1$ and $e_2$ are provided in series, a constant difference is provided between the applied voltage and the total or resultant induced voltage during the commutation interval of the windings 11 and 12. This produces a constant current magnitude when the induced voltage $e_1$ continually supplements the induced voltage $e_2$ in the manner illustrated in FIG. 2a. This is achieved by providing a voltage which is the same in each of the windings 11 and 12 in such a manner that after after the computation period has elapsed, half of the voltage amplitude $e_1 \sqrt{2}/2$ and $e_2 \sqrt{2}/2$ is provided. Half the commutation period is intended to mean the time at which the permanent magnet rotor is at an angle of rotation of 45 electrical degrees. Before and after the half commutation period, that is, between 0° and 45 electrical degrees and between 45° and 90 electrical degrees, the voltage curves are symmetrical about said half commutation period point. This is clearly illustrated in each of FIGS. 2a, 2b and 2c.

In a concentrated winding such as, for example, where each winding corresponding to each pole arc is positioned in a slot formed in the stator, the resultant induced voltage curve may be provided by so magnetizing the rotor 19 or by so geometrically shaping said rotor that the indication distribution along the pole arc is provided in the aforedescribed manner. In most cases, the copper winding must be distributed according to the pole arc in order to provide adequate utilization of space for the winding and therefore the entire motor. When the winding it distributed over the entire pole division, the winding factor causes the induced voltage to approximate a sinusoidal function despite the different direction of the field produced by the rotor. Usually, in miniature motors, a high degree of efficiency is preferable to a high degree of space utilization, so that the winding need not be provided on the entire circumference of the stator.

The influence of the winding factor in a distributed winding suppresses the harmonics in the winding and closely approximates the induced voltage to a sinusoidal function even when the field is nonsinusoidal and the voltage is strongly induced. If the corresponding winding is concentrated in only one part of each half of a pole arc, the induced voltage approximates the desired field in accordance with the degree of concentration of the winding. This causes the total or resultant induced voltage to approximate a constant magnitude, to a satisfactory extent, so that losses caused by variation of the induced voltages are kept small.

The desired curve configuration for the induction along the pole arc may be provided by an appropriate magnetizing device or by so shaping the magnetic poles that the length of the paths of lines of force in the magnetic material will cause the desired induction distribution, taking into account the path length in air as well as the armature reaction. An appropriate or suitable configuration of the magnetic poles is determined in accordance with the known rules for magnetic circuits which include permanent magnetic materials.

In FIG. 3a, the rotor 31 is of hexagonal configuration in axial section. Synthetic nonmagnetic material 32 is sprayed onto the hexagonal rotor 31 to form a cylinder around said rotor, thereby reducing noise generation and air friction losses. In FIG. 3a, arrows 33 indicate the direction of magnetization of the permanent magnetic rotor 31.

The rotor 31 of FIG. 3a may comprise a ferrite material and is dimensioned in accordance with the rules applying to magnetic circuits and in accordance with the properties of the ferrite material. As shown in FIG. 3b, the rotor 31 produces an approximately linear increase in induction voltage until the center of the pole arc. In FIG. 3b, an arrow 34 represents the magnitude of the DC voltage which energizes the windings and an arrow 35 represents the commutation period of the windings.

In FIG. 3b, the abscissa represents the pole arc in electrical degrees and represents time when the angular velocity of the rotor is constant. The ordinate represents the induced voltage. In FIG. 3b, a curve 36 represents the induced opposing voltage $e_1$ and a curve 37 represents the induced opposing voltage $e_2$. A curve 38 is the resultant or sum of the induced opposing voltages $e_1$ and $e_2$.

While the invention has been described by means of specific examples and in specific embodiments, we do not wish to be limited thereto, for obvious modifications will occur to those skilled in the art without departing from the spirit and scope of the invention.

We claim:

1. A DC motor comprising a permanent magnet rotor having magnetic poles each having a pole arc having a specific extent determined by the number of poles and pole divisions; and a stator having electronically switched winding groups comprising two winding groups displaced by 90 electrical degrees within each of the pole divisions and periodically connected in series by electronic switching components, the magnetization of the permanent magnet poles of the rotor producing an induction distribution along the pole arc the sum of the induced individual voltages of which is substantially constant in the winding groups.

2. A DC motor as claimed in claim 1, wherein the magnetization of the permanent magnet poles of the rotor is such that at 45 electrical degrees from the center of each pole the induction valve equals half the amplitude value of the sum of the induced voltages and the distribution of the amplitude values is point symmetrical toward both sides of the half amplitude value so that induction variations progressing along the pole arc are oppositely equal in a positive and negative sense.

3. A DC motor as claimed in claim 1, wherein the geometric configuration of the permanent magnet poles of the rotor provides the induction distribution along the pole arc.

4. A DC motor as claimed in claim 1, wherein the windings of each winding group are positioned so that they extend over less than half the pole arc.

5. A DC motor as claimed in claim 1, wherein the windings of each winding group are positioned so that they extend over one-half of a pole arc and wherein the distribution of the winding along the pole arc is irregular.

6. A DC motor as claimed in claim 1, wherein said stator includes a plurality of slots formed therein and the windings of each winding group are positioned in said slots so that they extend over one corresponding half of the pole arc, said windings being wound in said slots to different extents.

7. A DC motor as claimed in claim 1, wherein said rotor comprises a ferrite material.

8. A DC motor as claimed in claim 1, wherein said rotor is of nonmagnetic material of cylindrical configuration.